(12) United States Patent
Furuya et al.

(10) Patent No.: US 6,800,398 B1
(45) Date of Patent: Oct. 5, 2004

(54) ALKALINE STORAGE BATTERY POLE PLATE AND PRODUCTION METHOD FOR ALKALINE STORAGE BATTERY POLE PLATE AND ALKALINE STORAGE BATTERY

(75) Inventors: Satoshi Furuya, Kanagawa (JP); Gota Asano, Kanagawa (JP); Masaharu Miyahisa, Kanagawa (JP); Ayahito Shiosaki, Kanagawa (JP); Yoshihisa Inaba, Kanagawa (JP); Yoshiyuki Tada, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 293 days.

(21) Appl. No.: 09/787,774
(22) PCT Filed: Jul. 12, 2000
(86) PCT No.: PCT/JP00/04654
§ 371 (c)(1),
(2), (4) Date: Jun. 13, 2001
(87) PCT Pub. No.: WO01/06582
PCT Pub. Date: Jan. 25, 2001

(30) Foreign Application Priority Data

Jul. 21, 1999 (JP) .......................................... 11-205912
Sep. 16, 1999 (JP) .......................................... 11-262139

(51) Int. Cl.$^7$ ............................................... H01M 8/06
(52) U.S. Cl. ...................... 429/234; 429/236; 429/238; 429/241; 429/242
(58) Field of Search ................................. 429/234, 236, 429/238, 241, 242, 14, 34, 38, 39, 208, 209, 233, 239

(56) References Cited

U.S. PATENT DOCUMENTS 6,309,771 B1 * 10/2001 Faris et al. .................... 429/27

FOREIGN PATENT DOCUMENTS

| JP | 51-134836 | 11/1976 |
| JP | 59-207560 | 11/1984 |
| JP | 60-133655 | 7/1985 |
| JP | 5-41211 | 2/1993 |
| JP | 09027342 | 1/1997 |
| JP | 09106814 | 4/1997 |
| JP | 11-40146 | 2/1999 |

OTHER PUBLICATIONS

International Search Report, application No. PCT/JP00/04654, dated Oct. 24, 2000.

* cited by examiner

*Primary Examiner*—Michael Barr
*Assistant Examiner*—Monique Wills
(74) *Attorney, Agent, or Firm*—RatnerPrestia (57) ABSTRACT

A battery used by rolling a pole plate, formed by filling an active material, around a substrate using a band-shaped metal porous body having three-dimensionally linked spaces is inferior in flexibility and likely to short-circuit. According to this invention, grooves are formed in active material-filled substrate filled with the above active material, and then the grooved substrate is pressed flat to form groove active material layers, whereby cracks are made in the bottoms of the grooves preferentially, and cracks are pressed by the groove active material layers and blocked to prevent the flow-out of swelled projections of the cracks and the active material. Accordingly, a higher-capacity and higher-reliability battery is provided.

17 Claims, 7 Drawing Sheets

ALKALINE STORAGE BATTERY POLE PLATE AND PRODUCTION METHOD FOR ALKALINE STORAGE BATTERY POLE PLATE AND ALKALINE STORAGE BATTERY

Technical Field of the Invention

The present invention relates to electrodes for alkaline storage batteries, a method for manufacturing electrodes for alkaline storage batteries, and improvement of alkaline storage batteries.

Background of the Technology

Alkaline storage batteries as represented by nickel-hydrogen batteries and nickel-cadmium batteries, etc., are small, light weight and provides high output densities. In recent years, their field of practical applications is not limited to small devices such as personal computers and mobile phones but is extending to the area of large size power sources such as for electric vehicles and hybrid electric vehicles. In association with the expanding applications of these batteries, increasingly higher capacity and reliability are now being required.

In alkaline storage batteries, a prismatic structure in which a battery is configured by assembling plate-form positive electrodes and negative electrodes with separators interposed and housing in a prismatic container, and a cylindrical structure in which a battery is configured by spirally winding a rectangular positive electrode and a negative electrode with a separator interposed thus configuring an electrode group and housing it in a cylindrical container, are generally adopted.

On the other hand, in recent years, three-dimensional porous metal substrates (hereinafter porous substrates) such as foam metal of nickel or non-woven metal fabric having three-dimensionally connected space with as high a porosity as exceeding 90% have been developed, and a new method for manufacturing electrodes by directly filling paste of active material particles into these substrates has been developed, and these electrodes are now in wide use in the above-mentioned prismatic and cylindrical batteries as the electrodes suited for higher capacity. However, it has become clear that there exist reliability related issues arising from the manufacturing method and structure of the electrodes employing the above-mentioned three-dimensional porous substrate. It is an object of the present invention to improve the electrodes from the standpoint of the structure and the manufacturing method, and to establish reliability of alkaline storage batteries provided with electrodes that employ the above-mentioned three-dimensional porous substrate.

As an active material paste to be filled into a porous substrate, active material paste for the positive electrode of an alkaline storage battery that contains nickel hydroxide as the main constituent added with a material required for electrode reaction such as cobalt metal, nickel metal, and carbon powder, and active material paste for the negative electrode that contains hydrogen absorbing alloy or cadmium hydroxide as the main constituent added with a material such as carbon powder and nickel powder required for electrode reaction, and a binder such as carboxymethyl cellulose and the like are in use.

Electrodes using three-dimensional porous bodies filled with the above-mentioned active materials have been generally used as a positive electrode or a negative electrode of a battery after being pressed into a predetermined thickness after the paste was filled.

It is common that a dense surface layer has been formed on the surface of an electrode pressed as above. Such a dense surface layer hampers penetration of liquid electrolyte into the inside causing dispersion in the quantity of injected liquid electrolyte from battery to battery thus suffering from dispersion in the characteristics.

On the other hand, the above-mentioned three-dimensional porous body is a structural material with an originally low degree of freedom of deformation against bending force. When an electrode fabricated by filling an active material into such a structural material and further pressing the degree of freedom against bending force is further limited. When trying to configure an electrode group by forcefully winding the electrode, disorderly cracks, may occur on the outside of the electrode being wound, or a squarishly wound electrode group with poor roundness is formed, thereby causing failure when inserting into a cylindrical metal container. Furthermore, at the above-mentioned cracks, burrs from the damaged portion may project from the surface or active material particles may flow out from the damaged portion, thus penetrating the separator and causing short-circuits of various sizes, further causing initial or time-varying voltage failures or short-circuit failures.

As a prior art for improving the above issues, a technique has been proposed as disclosed in Japanese Laid-Open Patent Application No. Sho 60-133655, in which V-shaped grooves are formed on both sides of an electrode and winding it with the direction of the grooves in parallel to the axis of winding. Furthermore, in Japanese Laid-Open Patent Application No. Hei 5-41211, disclosure has been made on grooves having a trapezoidal or semi-elliptical cross section instead of grooves having a V-shaped cross section with which a porous metal body is easy to fracture. However, formation of grooves on both sides is disadvantageous in increasing the quantity of active material to be filled.

Accordingly, as a method for manufacturing by uniformly forming grooves by making the distribution of filled active material uniform, one in which active material paste is filled from one side of a three-dimensional porous metal body toward the opposite side has been proposed in Japanese Laid-Open Patent Application No. Hei 9-106814. Also, a technique is disclosed in which a layer filled with a high-density active material is formed on the side of the above-mentioned filled surface by filling the active material in a manner such that it hardly passes to the opposite side, and a layer filled with a low-density active material or a non-filled layer is formed on the opposite side, and grooves are formed on the surface of the low-density filling side. Furthermore, in the same Japanese Laid-Open Patent Application No. Hei 9-106814, a description is made on examples of a method of manufacturing in which grooves or rifts are formed on one side of a three-dimensional porous material body prior to filling paste and a method of manufacturing an electrode in which active material paste is filled from the side opposite to the side on which the grooves or rifts are provided, and further, on a structure in which electrodes are wound in a manner such that the above-mentioned grooves face outward.

On the other hand, in Japanese Laid-Open Patent Application No. Hei 9-27342, an electrode comprising a high-density active material-filled layer and a low-density active material-filled layer similar to the one disclosed in Japanese Laid-Open Patent Application No. Hei 9-106814 is disclosed, and both of a structure made by winding with the low-density active material-filled layer facing inward and a structure made by winding with the layer facing outward are disclosed.

In addition, as an example, a description is made on a method of manufacturing in which grooves or rifts are provided on a three-dimensional porous body prior to the step of filling an active material and active material paste is filled from the side opposite to the side where the grooves or rifts have been provided, and a method of manufacturing in which an active material is filled conversely from the side where the grooves or rifts have been provided.

In either case, electrodes having grooves as described above showed improved flexibility in a configuration in which the electrodes had been wound with the side having grooves facing outward due to freedom of extension of the surface as given by cracks occurring preferentially inside the grooves, and tended to cause fewer voltage failures.

Nevertheless, it has become clear that many voltage failure cases still occur. From the analysis of the causes, it was found that, in the above existing groove forming configuration, burrs of cracks occurring inside the grooves either bulge and project out by the winding force or active material particles from the cracks flow out to the outer periphery of the electrodes passing through the grooves, thus causing new short circuits.

To summarize, it was found that inside of the grooves formed on the surface of a substrate filled with an active material was an empty space, and was unprotected against bulging and projection of burrs due to cracks occurring inside the grooves or against flowing out of active material particles from the cracks, thus creating causes for reduction in reliability.

Also, in an electrode fabricated by forming in advance grooves or rifts on one side of a three-dimensional porous body and filling an active material from the surface provided with the above grooves or rifts, even though the active material is filled in the grooves or rifts, the active material particles filled in the grooves or rifts are fluidized when dampened by a liquid electrolyte and easily flow out from the grooves as the active material existing there is simply an aggregate of active material particles as filled. It was found that an aggregate of the active material fluidized as above did not have any control over bulging and projecting of burrs at cracks and flowing out of the active material, or it rather caused new short circuits.

That is, in order to enhance reliability of alkaline storage batteries that employ electrodes using a three-dimensional porous metal body while attaining a higher capacity, new issues have become clear, especially in cylindrical batteries, such as development of an appropriate electrode structure for controlling bulging and projecting out at cracks that occur inside the grooves and flowing out of active material particles, and a method of fabrication appropriate for manufacturing the electrode structure while improving penetrability of liquid electrolyte into electrodes.

DISCLOSURE OF THE INVENTION

In order to address the above issues, the present invention discloses an electrode for an alkaline storage battery in which grooves are formed on the surface of an active material-filled substrate comprising a porous metal substrate having three-dimensionally connected space and an active material filled in it and, by pressing the active material filled substrate, a coarse in-groove active material layer with a low active material filling density in the grooves and a dense surface layer with a high active material filling density are alternately forming a nearly smooth surface.

The present invention also discloses, as a method of manufacturing for effectively forming the above structure, a method of manufacturing an electrode for an alkaline storage battery that comprises steps of filling an active material in which a filled substrate is formed by filling active material paste into a porous metal substrate having three-dimensionally connected space, forming grooves on one side of the filled substrate, and pressing the groove-formed electrode to obtain a nearly smooth surface.

Furthermore, an alkaline storage battery having an electrode group made by winding an electrode obtained by the above method with the side having the grooves facing outward and with the direction of the grooves and the axis of winding in parallel to each other is disclosed.

The electrode of the present invention has on its surface a coarse in-groove active material layer, and the layer provides a channel for penetration of a liquid electrolyte thereby improving penetrability of the electrode for the liquid electrolyte. Also, although the grooves have apparently disappeared as the surface had been smoothed, an effect of improving flexibility is obtained in a structure in which a plurality of grooves are formed in parallel. Furthermore, as cracks occurring inside the grooves are pressed by the in-groove active material layer formed by pressing, bulging and projection of burrs and flowing out of the active material can be controlled.

Exemplary embodiments of the present invention will be described in the following.

The electrode for an alkaline storage battery of the present invention has a plurality of parallel grooves on one side of an active material-filled substrate comprising a porous metal substrate having three-dimensionally connected space and an active material filled in it. In the grooves, a nearly smooth surface is formed by a coarse in-groove active material layer and a dense surface layer with a high active material filling density formed by pressing.

In the present invention, a high capacity, high flexibility electrode can be obtained by forming an active material layer in the grooves that were empty in the prior arts disclosed in Japanese Laid-Open Patent Applications No. Sho 60-133655 and No. Hei 5-41211. Also, the electrode for an alkaline storage battery of the present invention is characterized by having a coarse and a dense surfaces formed by alternately and regularly repeating in parallel a dense surface layer and a coarse surface formed on the in-groove active material layer, and is superior in absorbing liquid electrolyte. A structure available with the present invention cannot be expected from making grooves or rifts in a porous metal substrate in advance as disclosed in Japanese Laid-Open Patent Applications No. Hei 9-106814 and No. Hei 9-27342.

Furthermore, as the electrode for an alkaline storage battery of the present invention does not have fractured portion on the skeleton: of a porous metal body that is in contact with the in-groove active material layer, occurrence of short circuits due to projection of burrs is controlled when wound as an electrode of an alkaline storage battery while at the same time an electrical conduction channel is maintained, and when used as an electrode of a battery, internal resistance decreases compared to the prior arts and large-current discharge characteristic is improved.

In an example of the manufacturing method to obtain an electrode for an alkaline storage battery of the present invention, the steps of filling an active material in which an active material-filled substrate is formed by filling an active material into a porous metal substrate having three-dimensionally connected space, forming grooves on one side of the active material-filled substrate, and nearly smoothly pressing the electrode formed with the grooves to a predetermined thickness are successively performed.

An electrode for an alkaline storage battery of the present invention with a uniform filled quantity of active material is obtained by filling, in the step of filling an active material, active material paste from one side of a porous metal body in a manner such that it will not penetrate to the opposite side, and forming grooves, in the step of forming grooves, on the side the active material paste is filled.

When configuring a cylindrical alkaline storage battery by using an electrode for alkaline storage battery of the present invention in at least one of the positive electrode and the negative electrode and an electrode group wound with a separator interposed, winding is performed with the side having the in groove active material layer facing outward and the direction of the grooves and the axis of winding in parallel.

During this process, cracks are preferentially formed in the wound electrode starting at the line of intersection of the bottom and the walls of the plurality of parallel grooves. In the present invention, the cracks are not formed on the outer periphery of the electrode group except on the bottom of the grooves, and the depth of the cracks is shallower compared to prior arts thus lowering internal resistance of the battery and improving large-current discharge performance.

Also, the cracks are pressed by the in-groove active material layer, thereby controlling flowing out of the active material and projection of burrs.

DESCRIPTION OF THE PREFERRED EMBODIMENTS

Referring to drawings and examples, a description of the preferred embodiments of the present invention will be given below.

Figure 1:
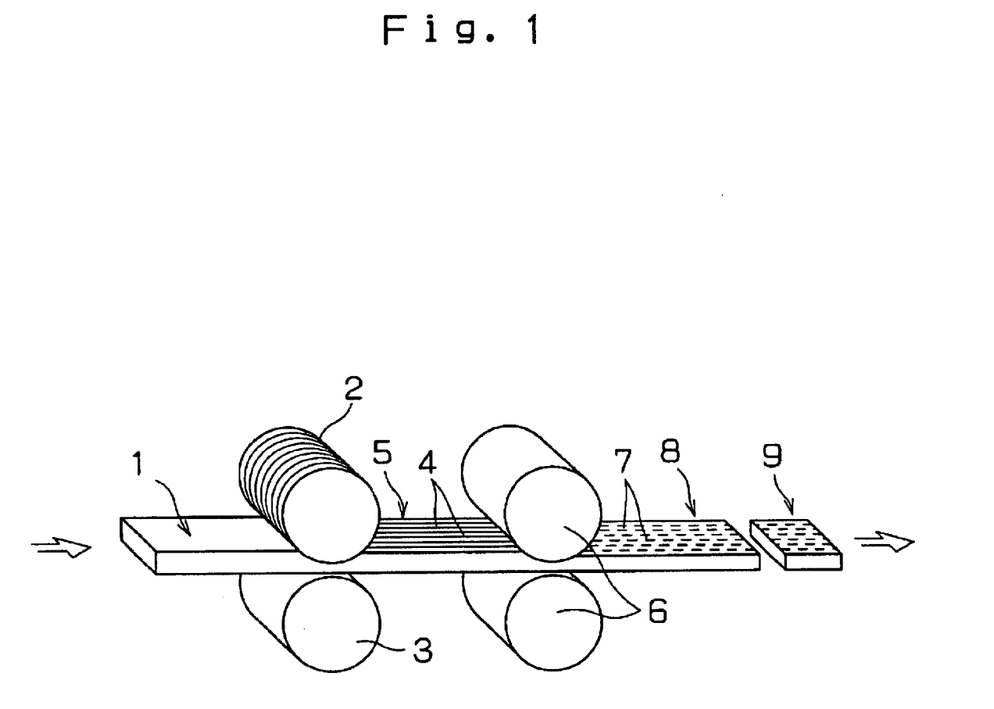
FIG. 1 is a perspective view illustrating the steps of obtaining an electrode of the present invention.

FIG. 1 is an example of a preferred device for fabricating an electrode for an alkaline storage battery of the present invention. By passing through a grooved roller 2 having ring-shaped ridges and smoothing roller 3, a substrate 1 filled with an active material is formed into a groove-formed substrate 5 having grooves 4 on one side.

Subsequently, by pressing the groove-formed substrate 5 with a pair of smooth pressing rollers 6, the active material oozes out in the grooves 4 thus forming an in-groove active material layer 7 and providing an electrode substrate 8 of the present invention.

Normally, the electrode substrate 8 is cut in the direction perpendicular to the direction of the grooves to obtain an electrode 9 of the present invention.

Figure 2A:
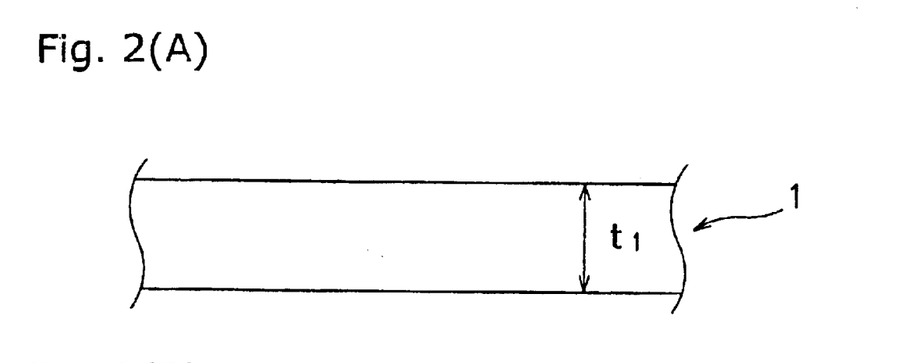
FIGS. 2A-C are drawings to illustrate change of the cross-sectional configuration of an active material-filled substrate in accordance with the method of manufacturing of the present invention.
Figure 2B:
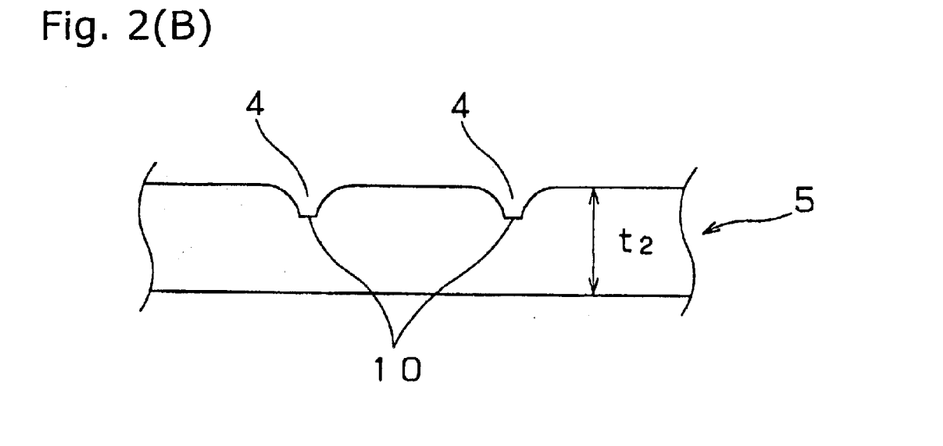
Figure 2C:
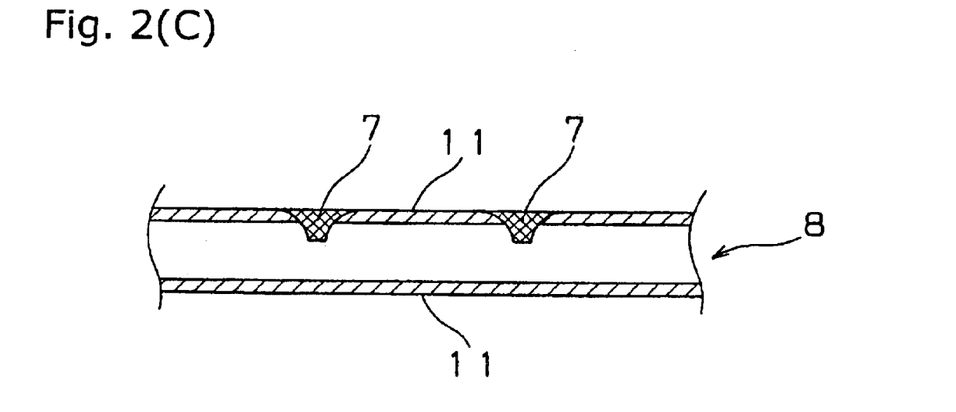

FIG. 2 illustrates the process of change, in terms of the cross-sectional configuration perpendicular to the direction of the grooves, of the active material-filled substrate in accordance with the manufacturing process of the present invention. In FIG. 2, (A) is the active material-filled substrate, (B) is the, groove-formed substrate, and (C) is the electrode substrate.

In the present invention, there are no restrictions on the thickness, porosity, pore diameter, shape of pore, etc., of the three-dimensional porous body, and existing three-dimensional porous bodies can be used. Depending on the purpose, generally used porous bodies with 1 mm to 3 mm thickness and 90% to 95% porosity are used.

For the fabrication of an active material-filled substrate, a method of using a porous body previously cut into a strip or flat plate and a method of using a continuous belt of porous body and cutting it at an arbitrary later step to the shape of an electrode are used. The latter is superior in mass producibility.

In the present invention, there is no particular limitation on the method of filling an active material, and any method cane be employed insofar as uniform filling can be made. For example, existing methods generally employed for filling an active material can be employed such as to fill an active material by passing a porous substrate through a bath of active material paste or to fill an active material by pressing from one or both sides by means of a fixed-volume ejection nozzle or a doctor knife.

As the active material paste, positive active material paste having nickel hydroxide as the main constituent and blended with necessary additives and a binder, and negative active material having cadmium hydroxide or metal hydroxide as the main constituent and blended with necessary additives and a binder are used.

Next, a description will be made on the step of forming grooves. By this step of forming grooves, the cross-sectional configuration changes from FIG. 2(A) to (B).

In forming grooves 4 on a belt-shaped active material-filled substrate 1, it is convenient to use a grooved roller 2 provided with a plurality of annular ridges on the periphery of the roller and a smoothing roller 3. On one side of the substrate 5 having belt-like grooves obtained by passing the rollers, a plurality of continuous grooves 4 are formed over the width in the direction of the belt-like substrate.

The first purpose of forming the grooves 4 is to apply a stress to the bottom 10 of the grooves thereby causing cracks to take place preferentially in the bottom 10 of the grooves when winding. The second purpose is to secure a space for forming a preferable in-groove active material layer 7 in the grooves with the active material caused to ooze from the skeleton of the porous body.

In the electrode of the present invention, the grade of the in-groove active material layer is affected by the configuration of the groove-formed substrate. For example, it is affected by the ratio of the depth of the grooves to the thickness of the groove-formed substrate, the state of damage of the metal skeleton of the porous substrate in the vicinity of the grooves of the groove-formed substrate, shape of the grooves, etc.

When the depth ratio of the grooves is too small, the effect itself of improving windability expected from the present invention is diminished. Also, the active material layer inside a groove becomes insufficient thus being unable to form an in-groove active material layer. Conversely, when the depth ratio is too large, skeleton of, the porous metal body becomes fragile, the active material inside a groove becomes excessive, and the densities of the in-groove active material layer and its surface layer increase.

Taking the above tendency into account, it is preferable to make the ratio of the depth of a groove to the thickness t2 of the groove-formed substrate 5 in the range from 20% to 50%.

If an area exists nearby the walls of a groove where the skeleton of the porous metal body is damaged, when such a substrate is employed as a battery electrode of the present invention, the damaged area causes short circuits and at the same time an excessive amount of active material flows into the groove thus making the densities of the in-groove active material layer and its surface layer too large. Consequently, it is important in this invention that the porous metal body of a groove-formed substrate does not have a damaged area in the skeleton of the porous metal body.

In the present invention, several preferable embodiments are made clear in which damage of the skeleton of a porous metal body can be prevented and an appropriate stress can be applied to the bottom 10 of a groove.

One of them is an embodiment in which a flat surface is made on the bottom 10 of a groove in parallel to the surface of the substrate. In this case, it is preferable to chamfer the intersections of the flat surface and walls of the groove to the shape of an arc, for example.

Figure 3A:
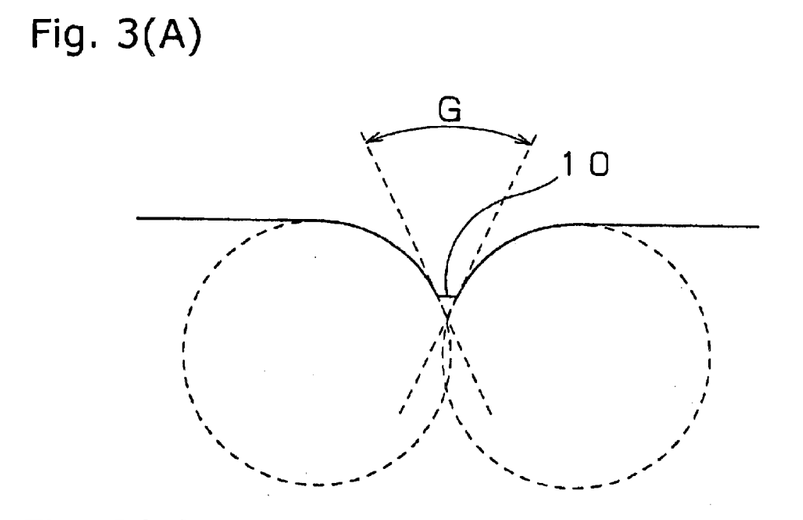
FIGS. 3A-C are cross-sectional views of a groove-formed substrate in an exemplary embodiment of the shape of a groove.
Figure 3B:
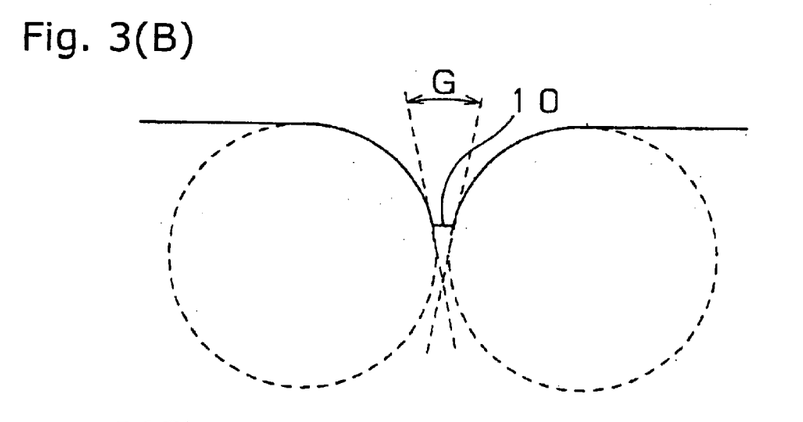
Figure 3C:
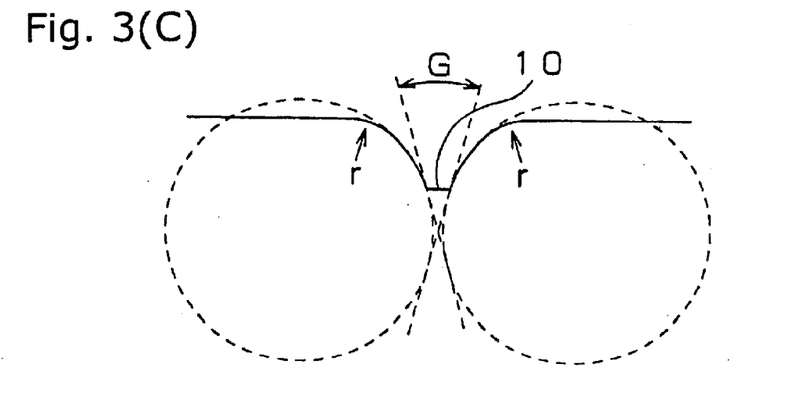

A configuration of a groove as constructed by walls as designed based on the shape formed by the outer peripheries of the two arcs as illustrated in FIG. 3(A), (B), (C) and a flat surface of the bottom 10 of the groove is found to be a preferable embodiment in that it applies a strong stress to the bottom 10 of the groove as well as prevents breakage of the skeleton of the porous metal body, and furthermore it tends to cause cracks preferentially on the bottom 10 of the groove when it comes to the step of being pressed.

When the cross section of the walls of the groove is formed with arcs crossing each other, both embodiment of FIG. 3(A) and embodiments (B), (C) formed by separated arcs are preferable embodiments, and configurations based on these configurations provide similar effects.

Defining the angle formed by the tangents of the two arcs at the intersection where they cross the flat area 10 on the bottom of the groove to be an angle of invasion, G, as illustrated in FIG. 3, it is preferable that G be in the range from 45° to 100°. When the angle of invasion, G, is too large, it becomes difficult to give a strong stress to the skeleton of the bottom of the groove and to secure necessary depth of the groove. Conversely, when it is small, there is possibility of occurrence of damage nearby the front end of the groove when forming the groove and possibility of occurrence of a trouble in which the grooves 4 bite the grooved roller 2 and will not be detached.

Next, a description will be given on the step of forming an in-groove active material layer.

This step is one in which a groove-formed substrate 5 is pressed in a manner such that the entire groove-formed substrate including the grooves forms a nearly smooth surface. It is simple to perform smoothing pressing by means of a pressing roller 6 having a smooth surface. During this step, the cross-sectional configuration changes from FIG. 2(B) to (C).

That is, an in-groove active material layer 7 is formed in the groove 4 that was a cavity at the stage of being a groove-formed substrate 5, thus providing an electrode substrate 8 of the present invention.

In this step, the state of dampness of the groove-formed substrate 5 to be pressed is arbitrary. However, when pressed under a damp condition, flowing out of the active material increases making control difficult. Furthermore, the active material sticks to the pressing device possibly making the pressed surface non-uniform. Accordingly, it is preferable to press under a dry condition.

Also, at this step, it is better to perform pressing using a pressing roller having an axis perpendicular to the direction of the grooves. Pressing using a pressing roller having an axis parallel to the direction of the grooves, that is, pressing in a direction perpendicular to the direction of the grooves causes elongation or warping of the groove-formed substrate, and will further result in the reduction of strength of the porous body substrate.

Different from a groove-formed substrate fabricated by a prior art, the surface of the electrode substrate 8 of the present invention is a nearly smooth coarse and dense surface due to an in-groove active material layer 7 formed by pressing the grooves of a groove-formed substrate and a dense surface layer 11 formed by pressing the areas other than the grooves. As a coarse surface and a dense surface generally have different reflectivity, a stripe pattern is observed on the surface of an electrode substrate 8 having a plurality of grooves. The observed color changes depending on the color and composition of the active material. For example, with a nickel positive electrode using a green or blackish brown active material, a stripe pattern formed by a blackish brown surface and a surface with whitish streaks corresponding to the grooves is observed suggesting that the surface is not uniform.

Subsequently, as illustrated in FIG. 1, by cutting a predetermined length equal to the width of an electrode in the direction of the length of the belt-like electrode 8, an electrode 9 of the present invention is obtained on which a plurality of parallel grooves have been formed perpendicular to the direction of the length of the electrode.

Figure 4:
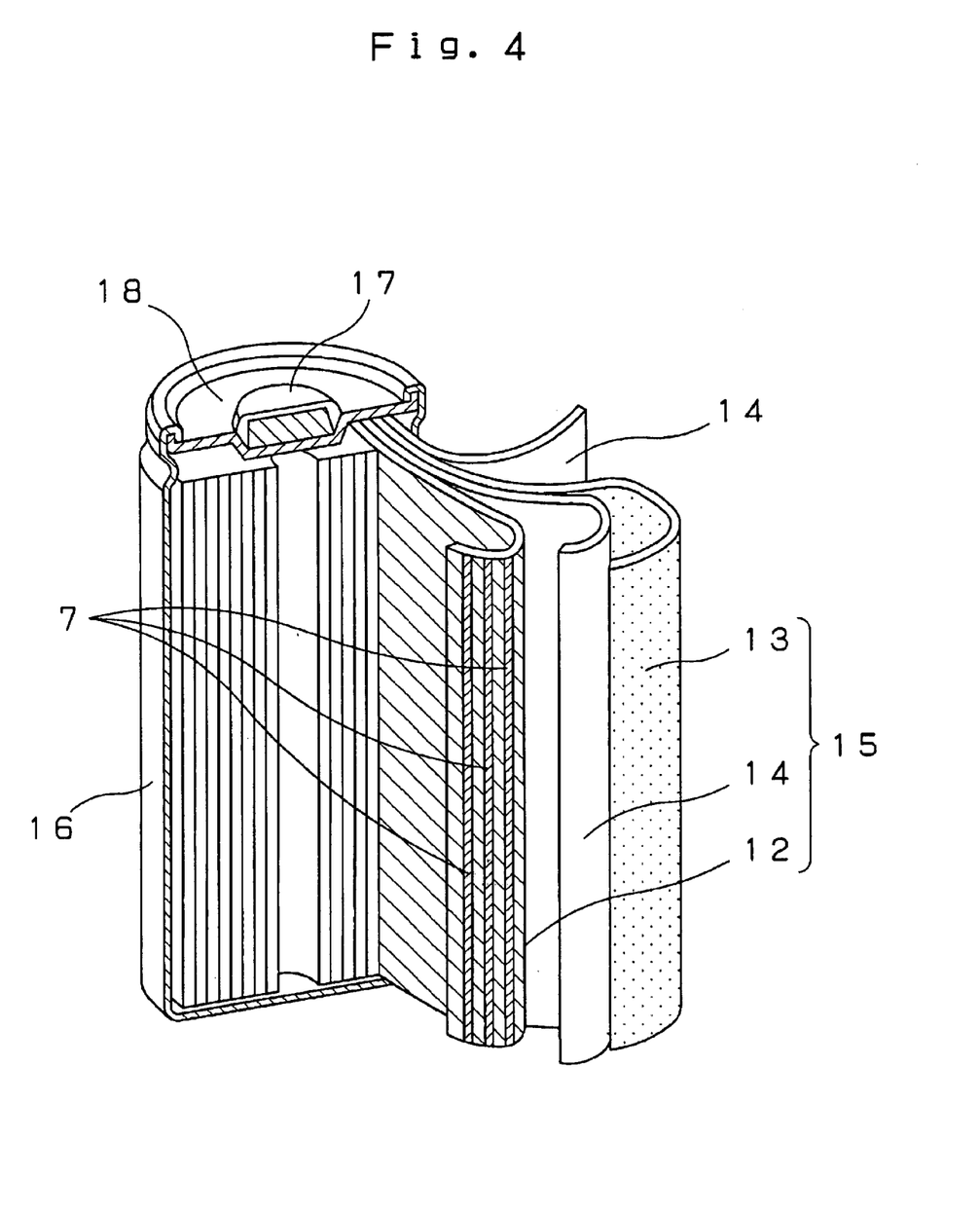
FIG. 4 is a disassembled perspective view of a cylindrical alkaline storage battery of the present invention.

FIG. 4 illustrates the state in which the electrode 9 is used as a positive electrode of a cylindrical battery.

In FIG. 4, an electrode group 15 is constructed by spirally winding a positive electrode. 12 and a negative electrode 13 with a separator 14 interposed. The electrode group 15 is housed in a cylindrical metal case 16, the bottom of a positive terminal 17 is electrically connected to the positive electrode 12, and the metal case 16 is electrically connected to the negative electrode 13. Furthermore, after pouring an alkaline liquid electrolyte, the electrode group is sealed with a sealing plate 18 having the convex positive terminal 17 and a safety vent.

Figure 5:
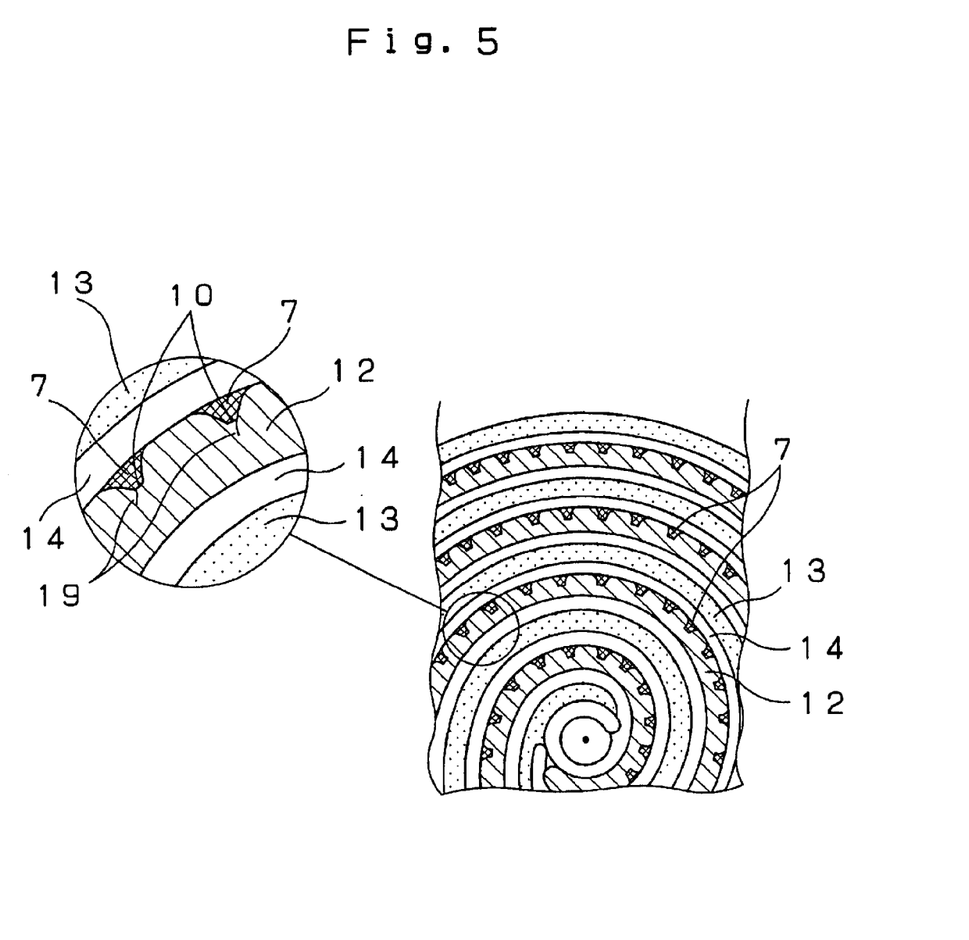
FIG. 5 is a plane cross-sectional view of an electrode group of a cylindrical alkaline storage battery according to the present invention.

FIG. 5 is a cross-sectional view of the electrode group 15 of the cylindrical battery as cut by a plane parallel to the bottom of the battery. As illustrated in FIG. 5, the positive electrode 12 is wound with the side having the in-groove active material layer 7 facing outward and with the axis of winding in parallel to the direction of the grooves.

By applying an electrode 9 as obtained by the present invention to a cylindrical battery as has been described above, various useful effects can be obtained as below.

(1) Different from previous grooved electrodes, grooves of the electrode 9 of the present invention are not empty space; although the filling density is low, they have an active material layer 7 providing a high filling density as an electrode as a whole.

(2) By forming the surface of the in-groove active material layer 7 nearly flat with the dense surface layer 11, it is possible to configure a pressing layer for effectively, pressing the in-groove active material layer 7 into the grooves with a separator 14, which is disposed on the surface when winding the electrode 9, working as the pressing surface.

(3) By pressing until the coarse and dense surfaces become nearly flat, it is possible to integrate the in-groove active material layer 7 with the electrode 9 and keep the active material in the in-groove active material layer 7 on the electrode until at least it is wound.

(4) By making the in-groove active material layer 7 and the surface layer 11 as pressed molds, it is possible to prevent fluidization and flowing out of the active material from causing new short circuits when a liquid electrolyte is poured into the electrode group 15, and at the same time solidify the in-groove active material layer 7 and effectively transmit pressing force to the inside of the grooves.

(5) By forming the in-groove active material layer and its surface coarse, that portion provides a channel for penetration of the liquid electrolyte while providing flexibility to the in-groove active material layer and freedom of elongation to the surface thus greatly improving windability of the electrode.

(6) In the event a force causing a crack on the electrode 9 is applied, a crack 19 is urged to occur preferentially on the bottom 10 of a groove thereby preventing cracks from occurring irregularly over the entire surface of the electrodes 9.

When the electrode 9 of the present invention is wound as illustrated in FIG. 5, a crack 19 is urged to occur preferentially on the line of intersection of the bottom 10 of the groove and the walls, and the in-groove active material layer 7 is elongated to allow smooth winding. The phenomenon that the crack 19 occurs preferentially on the bottom 10 of the groove deformed from the original groove 4 even after pressing and smoothing a once-formed groove 4 in this way until it apparently disappears thus improving windability is a new discovery which has never been predicted.

(7) Also, in the present invention, grooves are formed in a manner such that the skeleton of a metal porous body is not damaged in the step of groove forming, and at the same time power receiving ability of the porous substrate is maintained as the length of cracks 19 that occur after winding is short. As a result, internal resistance of the battery is lowered and large-current discharge performance is improved compared to the prior art.

(8) In a wound electrode group 15, the surface of the in-groove active material layer 7 is pressed by an adjacent separator 14, its force of pressing is transmitted to the bottom of the grooves, thus pressing and closing the cracks 19 and preventing bulging and projecting out of the damaged portion or flowing out of the active material.

Next, in order to verify the effect on reliability of an electrode 9 of the present invention as applied to an alkaline storage battery, a positive electrode for an alkaline storage battery in accordance with the present invention was fabricated, and a cylindrical alkaline storage battery using it was fabricated. At the same time, an electrode with a prior art configuration was fabricated and the characteristic relating to reliability of the electrode and battery of the present invention was compared.

EXAMPLE 1

Active material paste was prepared by adding to 100 parts by weight of nickel hydroxide 0.2 parts by weight of carboxyl methyl cellulose as a binder and water so that it equals 25% by weight of the total weight of the paste.

A 1.7 mm-thick belt-like active material-filled substrate 1 was fabricated by using as the support a belt-like foam metal porous body 115 mm in width, 1.7 mm in thickness, with a porosity in the range 92% to 95%, and having three-dimensionally connected space, and filling the active material paste from both sides of the porous body.

Subsequently, by using a grooved roller 2 provided with a plurality of annular ridges on the outer periphery of the roller and a smooth roller 3, 0.35 mm deep grooves 4 that continue in the direction of the progress of the substrate are formed on one side of the belt-like active material-filled substrate 1 at a pitch of 1.5 mm in the direction of the width of the belt-like substrate. The thickness of the groove-formed substrate 5 became 1.0 mm. The shape of the grooves was chosen to be as illustrated by FIG. 3(A). Next, by using a smoothing roller 6, the groove-formed substrate 5 was pressed to a thickness of 0.8 mm to ooze out the active material into the grooves while the in-groove active material layer 7 was press-formed to make a nearly smooth coarse and dense surface.

From this belt-like substrate, an electrode 9 for an alkaline storage battery, 61 mm in width and 110 mm in length, was fabricaed. The electrode is referred as electrode P.

Separately, a negative electrode 13, 61 mm in width, 145 mm in length, and 0.4 mm in thickness, was fabricated by coating on a punched metal paste having hydrogen absorbing alloy powder as the main component. Using the electrode P as a positive electrode 12, an electrode group 15 was constructed by winding it together with the negative electrode 13 with a separator 14 interposed. In doing this, the positive electrode 12 was wound in a manner such that the side provided with grooves face outward. An HR17/67 size cylindrical alkaline storage battery, as illustrated in FIG. 4, having a nominal capacity of 3800 mAh was fabricated by housing the electrode group 15 in a cylindrical metal case 16, connecting terminals, pouring a liquid electrolyte, and sealing with a seal plate 18. This battery is referred to as battery P.

COMPARATIVE EXAMPLE 1

Setting the thickness of a smooth pressed substrate at 0.8 mm, an electrode was fabricated under the same condition as the example of the present invention with the exception of cutting electrode configuration without going through the groove forming step and the in-groove active material layer forming step. The electrode obtained is referred to as electrode Q. Also, a cylindrical alkaline storage battery was fabricated with the same structure as the example of the present invention with the exception of using the electrode Q as the positive electrode 12. This battery is referred to as battery Q.

COMPARATIVE EXAMPLE 2

Setting the thickness of a groove-forming substrate at 0.8 mm, an electrode was fabricated under the same condition as the example of the present invention with the exception of doing away with the in-groove active material layer forming step and making the depth of the grooves nearly the same as that of the grooves of the positive electrode 12 of the present invention. This electrode is referred to as electrode R. Also, a cylindrical alkaline storage battery was fabricated with the same structure as the example of the present invention with the exception of using the electrode R as the positive electrode 12. With this positive electrode 12, winding was performed in a manner such that the surface having grooves comes to the outer periphery. This battery is referred to as battery R.

Figure 6:
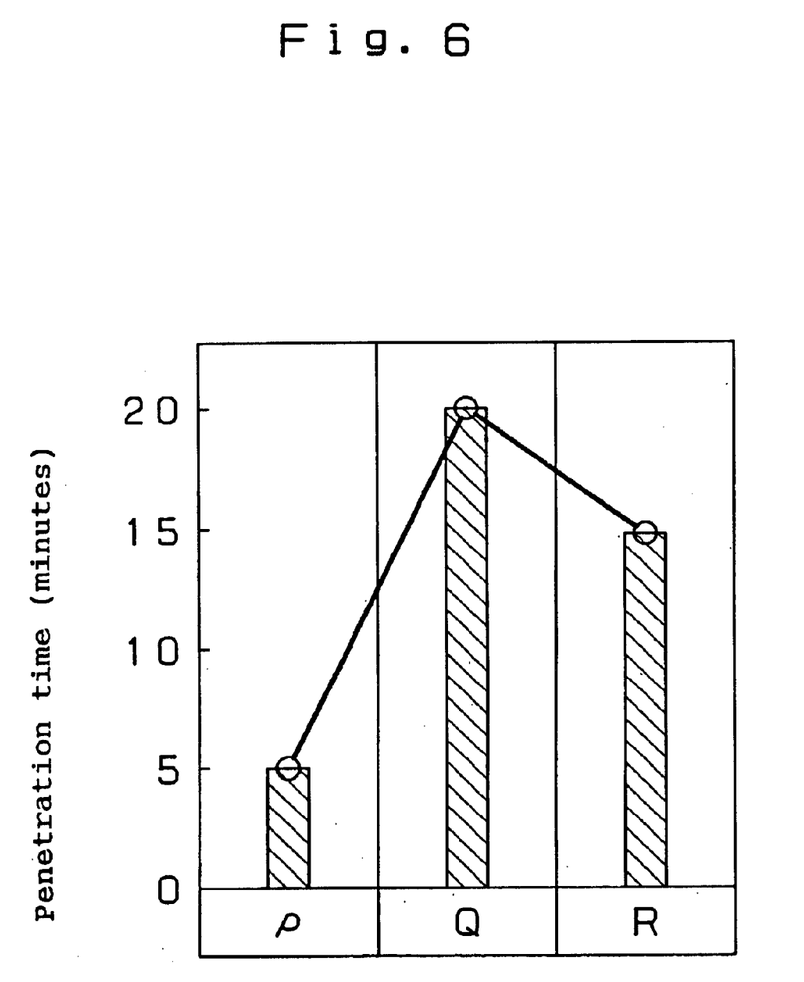
FIG. 6 is a graph comparing speed of penetration of alkaline liquid electrolyte in an electrode, of the present invention with that of a prior art electrode.

Penetrability of liquid electrolyte was studied on the electrodes P, Q, and R. To begin with, the electrodes P and R were placed with the surface having grooves upward, the electrode Q was placed with the smooth pressed surface at a horizontal position, 5 ml of 40% concentration alkaline liquid electrolyte was dropped on the electrodes, and the time of absorption until the drops disappeared was measured as the speed of penetration of the liquid electrolyte. FIG. 6 shows the results.

As can be seen from the graph, the penetration time of the liquid electrolyte was approximately 20 minutes for the smooth electrode Q on which grooves 4 had not been formed, whereas, with the electrode R on which grooves had been formed, the time was approximately 15 minutes indicating some improvement. Furthermore, the electrode P provided with an in-groove active material layer 7 of the present invention showed a penetration time of approximately 5 minutes.

The above results appear to suggest that, with the electrode Q in which a dense surface layer has been formed over the entire surface, the dense surface layer hampers the penetration of the liquid electrolyte to inside. Also, the reason for some improvement over the electrode Q of the speed of absorption of the liquid electrolyte by the electrode R is considered to be due to the fact that an active material surface layer thinner than the surface layer 11 has been formed on the walls of the grooves although a dense surface layer formed inside the grooves when forming the grooves exists. On the other hand, the reason for great improvement in the speed of absorbing the liquid electrolyte of the electrode P of the present invention is considered to be due to the fact that a dense surface layer has not been formed on the walls of the grooves and that the active material layer 7 formed in the grooves is a coarse pressed body with a high penetrability of liquid electrolyte.

Next, improvement in windability was studied. The probability of occurrence of insertion failures while inserting a spiral electrode group into a cylindrical case was studied when 1000 pieces each of cylindrical batteries were fabricated.

As a result, with the battery Q, as many as 50 insertion failures occurred. Conversely, no insertion failure occurred with the battery P and battery R.

This indicates that windability has been improved by the formation of the grooves that enabled an electrode group configuration close to a true circle. It also indicates that the electrode of the present invention has not lost the effect on windability of forming grooves despite being pressed to apparent flatness.

Lastly, probability of occurrence of voltage failures due to short circuits was studied. Probability of voltage failure occurrence was studied on 1000 pieces of batteries that were free from insertion failures. The batteries were charged by a predetermined method, left standing for a week, and then open circuit voltage was measured. Batteries with an open circuit voltage of 1.20 v or greater were judged good, and those with an open circuit voltage of below 1.20 v were judged defective.

Figure 7:
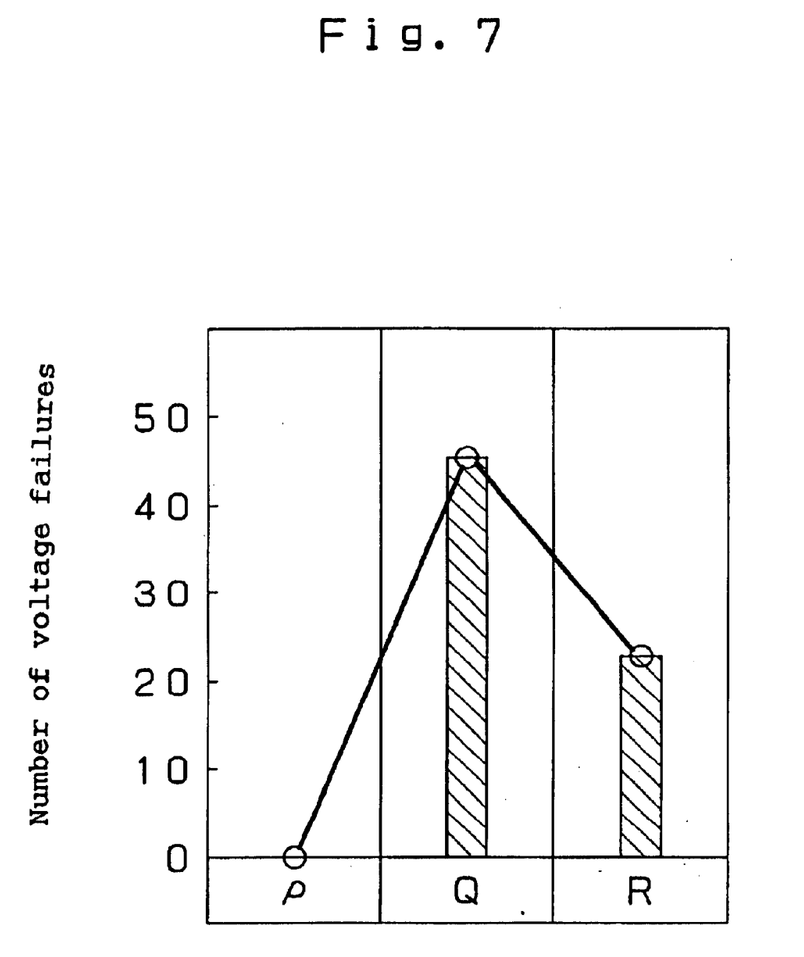
FIG. 7 is a graph comparing number of occurrence of voltage failures between an electrode of the present invention and that of a prior art used in a cylindrical alkaline storage battery.

FIG. 7 shows the number of occurrence of defectives. As shown by the graph, 45 pieces of voltage failure batteries occurred with the batteries Q using the electrode Q that does not have grooves. Also, with the batteries R using the electrode R that has grooves but has no in-groove active material layer formed, the number of voltage failure batteries was 25 pieces. Compared with this, with batteries P that used the electrode P provided with an in-groove active material layer of the present invention, voltage failure was zero.

Analyses of the above defective batteries have revealed that, in the electrode Q in which no groove had been formed, cracks occurred randomly and at irregular locations on the surface of the electrode, thus the damaged portions piercing the separator, or active material particles flowing out from the cracks to be sandwiched between the electrode and the separator thus causing minute short circuits.

Also, with the conventional electrode R provided with grooves, cracks different from the random cracks of the electrode Q had been formed mainly inside the grooves, and either the burrs of the cracks bulged to the surface and projected out, or the active material flowing out from the cracks reached the electrode surface passing through the cavity of the grooves thus oozing in the separator, entered between the separator and the electrode thus causing large and small short circuits at various locations.

Contrary to this, with the batteries using electrode P of the present invention, although occurrence of cracks was observed at the line of intersection of the bottom 10 of the grooves and the walls, it was found that the area of cracks had been sealed by the in-groove active material layer thus protecting against flowing out of the active material or bulging or projecting of burrs. That is, it has been found that the present invention shows extraordinary effect in improving liquid electrolyte penetrability of an electrode using a three-dimensional porous body, improving flexibility of the electrode, and controlling short circuits during winding, thus greatly improving reliability of alkaline storage batteries suitable for high capacity using a three-dimensional porous body.

In this example, although a description has been made on a positive electrode, the fundamental structure and the method of fabrication of an electrode are the same for a negative electrode, and there is no question that similar effect can be obtained.

INDUSTRIAL APPLICATION

As has been described above, the present invention has an effect of improving the speed of penetration of a liquid electrolyte into electrodes irrespective of the configuration of the battery and, in a cylindrical alkaline storage battery, of improving windability of the electrodes and reducing possibility of short circuits. It exhibits a high reliability not only in small power supplies for personal computers, mobile telephones, and small power appliances such as small power tools, lawn mowers, etc., but also in wide applications including power supplies for electric vehicles and hybrid electric vehicles.

What is claimed is:

1. An electrode for an alkaline storage battery, said electrode comprising:
    an active material-filled substrate comprising a metal porous body substrate having three-dimensionally connected space and an active material filled therein;
    said substrate having a plurality of grooves on one side thereof; and
    an in-groove active material layer with a low active material filling density formed in the grooves;
    wherein a surface of said electrode, other than where said grooves are located, has a high active material filling density formed by pressing.

2. The electrode for an alkaline storage battery of claim 1, wherein a dense surface layer and a coarse surface formed on the in-groove active material layer are alternately and regularly repeated in parallel to form a coarse and dense surface.

3. The electrode for an alkaline storage battery of claim 1, wherein the skeleton of the metal porous body in contact with the in-groove active material layer does not have a fracture.

4. A method of manufacturing an electrode for an alkaline storage battery, the method comprising the steps of filling an active material by forming an active material-filled substrate by filling active material paste into a metal porous body substrate having three-dimensionally connected space, forming grooves filled with said active material; on one side of the active material-filled substrate, and pressing the electrode formed with the grooves to a predetermined thickness.

5. The method of manufacturing an electrode for an alkaline storage battery of claim 4, wherein the step of filling an active material is a step of filling in a manner such that the active material paste does not pierce from one side of the metal porous body to the opposite side, and the step of forming grooves is a step of forming grooves on the side the active material paste is filled.

6. The method of manufacturing an electrode for an alkaline storage battery of claim 4, wherein the ratio of the depth of the grooves to the thickness of the groove-formed substrate made by forming grooves on one side of the active material-filled substrate is in the range of 20% to 50%.

7. The method of manufacturing an electrode for an alkaline storage battery of claim 4, wherein the configuration of cross section cut perpendicular to a groove is one comprising walls formed by the shape of two arcs and a flat bottom of the groove parallel to the surface.

8. The method of manufacturing an electrode for an alkaline storage battery of claim 7, wherein an angle of invasion as defined by the angle formed by two tangents on a cross section perpendicular to the groove at the line of intersection of the bottom of the groove and both walls is in the range of 45 degrees to 100 degrees.

9. The method of manufacturing an electrode for an alkaline storage battery of claim 4, wherein the step of pressing the electrode formed with grooves nearly smooth is performed by a pair of smoothing roller having an axis perpendicular to the direction of the grooves.

10. An alkaline storage battery including an electrode group made by winding a positive electrode and a negative electrode with a separator interposed, wherein at least one of the positive and negative electrodes comprises a metal porous body having three-dimensionally connected space and an active material filled therein, a surface is configured by an in-groove active material layer made by pressing a groove-formed substrate layer in which a plurality of parallel grooves are formed on one side and a dense surface layer, and is wound around the axis of winding parallel to the direction of the grooves with the side having the in-groove active material layer facing outward.

11. An alkaline storage battery of claim 10, wherein cracks are preferentially formed in a wound electrode starting at the line of intersection of the bottom and the walls of the plurality of grooves formed in parallel and the cracks are pressed by the in-groove active material layer.

12. The electrode for an alkaline storage battery of claim 2, wherein the skeleton of the metal porous body in contact with the in-groove active material layer does not have a fracture.

13. The method of manufacturing an electrode for an alkaline storage battery of claim 5, wherein the ratio of the depth of the grooves to the thickness of the groove-formed substrate made by forming grooves on one side of the active material-filled substrate is in the range of 20% to 50%.

14. The method of manufacturing an electrode for an alkaline storage battery of claim 5, wherein the configuration of cross section cut perpendicular to a groove is one comprising walls formed by the shape of two arcs and a flat bottom of the groove parallel to the surface.

15. The method of manufacturing an electrode for an alkaline storage battery of claim 6, wherein the configuration of cross section cut perpendicular to a groove is one comprising walls formed by the shape of two arcs and a flat bottom of the groove parallel to the surface.

16. The method of manufacturing an electrode for an alkaline storage battery of claim 14, wherein the configuration of cross section cut perpendicular to a groove is one comprising walls formed by the shape of two arcs and a flat bottom of the groove parallel to the surface.

17. An electrode according to claim 1, wherein said high active material filling density is higher than said low active material filling density.

* * * * *